United States Patent
Szpara et al.

(10) Patent No.: US 12,508,415 B2
(45) Date of Patent: Dec. 30, 2025

(54) TUBE TWIST TUBING OCCLUDER

(71) Applicants: BAXTER INTERNATIONAL INC., Deerfield, IL (US); BAXTER HEALTHCARE SA, Glattpark (CH)

(72) Inventors: Edward Stanley Szpara, Saint Charles, IL (US); John Sterling Norman, Gurnee, IL (US)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 448 days.

(21) Appl. No.: 18/083,018

(22) Filed: Dec. 16, 2022

(65) Prior Publication Data

US 2023/0191105 A1 Jun. 22, 2023

Related U.S. Application Data

(60) Provisional application No. 63/292,799, filed on Dec. 22, 2021.

(51) Int. Cl.
| | |
|---|---|
| *A61M 39/12* | (2006.01) |
| *A61M 1/28* | (2006.01) |
| *A61M 39/20* | (2006.01) |
| *A61M 39/28* | (2006.01) |

(52) U.S. Cl.
CPC .......... *A61M 39/288* (2013.01); *A61M 1/285* (2013.01); *A61M 39/12* (2013.01); *A61M 39/20* (2013.01); *A61M 2205/581* (2013.01); *A61M 2205/582* (2013.01); *A61M 2205/583* (2013.01); *A61M 2210/1017* (2013.01)

(58) Field of Classification Search
CPC ...... A61M 1/285; A61M 39/12; A61M 39/20; A61M 39/288; A61M 2205/581; A61M 2205/582; A61M 2205/583; A61M 2210/1017
See application file for complete search history.

(56) References Cited

U.S. PATENT DOCUMENTS

| | | | | |
|---|---|---|---|---|
| 4,292,969 A | * | 10/1981 | Raible | A61M 39/28 604/250 |
| 4,620,564 A | * | 11/1986 | Ekholmer | F16K 7/08 604/250 |
| 2015/0362109 A1 | * | 12/2015 | Buchanan | A61M 39/12 285/399 |

FOREIGN PATENT DOCUMENTS

WO    WO 2004016312 A1 * 2/2004

* cited by examiner

*Primary Examiner* — John Kim
(74) *Attorney, Agent, or Firm* — K&L Gates LLP

(57) ABSTRACT

A tube occluder includes a body within which an end of the tube is attached; a twisting lug formed with or attached to the tube, the twisting lug including an outwardly extending shape; and a sleeve in rotational communication with the body, the sleeve including an internal profile that matingly engages the outwardly extending shape of the twisting lug, the sleeve rotatable relative to the body in a first direction such that the internal profile causes the twisting lug to twist the tube closed, the sleeve rotatable in a second direction such that the internal profile causes the twisting lug to twist the tube open. A tube occluding method includes enabling a user to rotate the sleeve relative to the body, causing the internal profile to turn the twisting lug and to twist the tube closed while the end of the tube remains secured within the body.

17 Claims, 5 Drawing Sheets

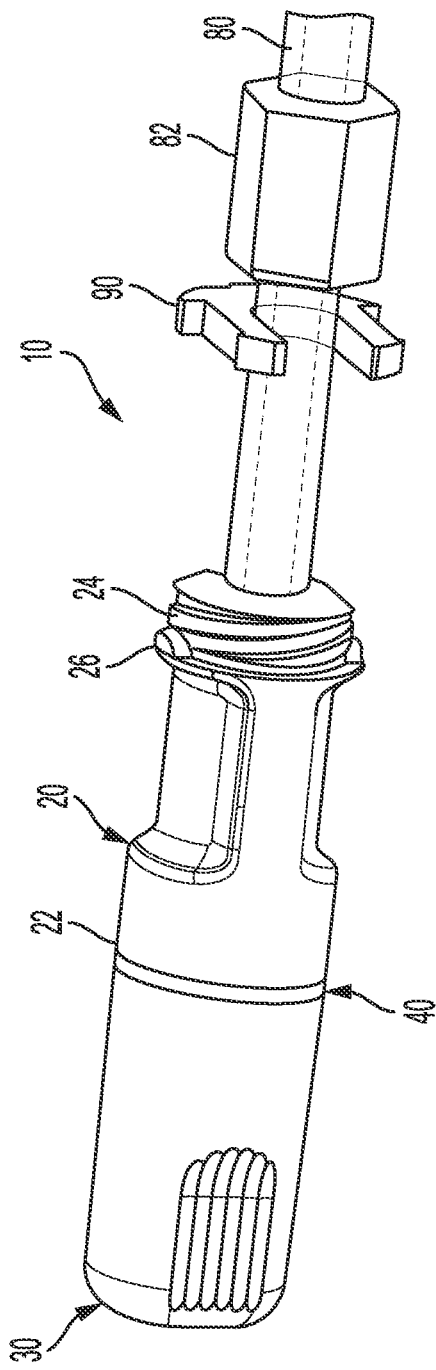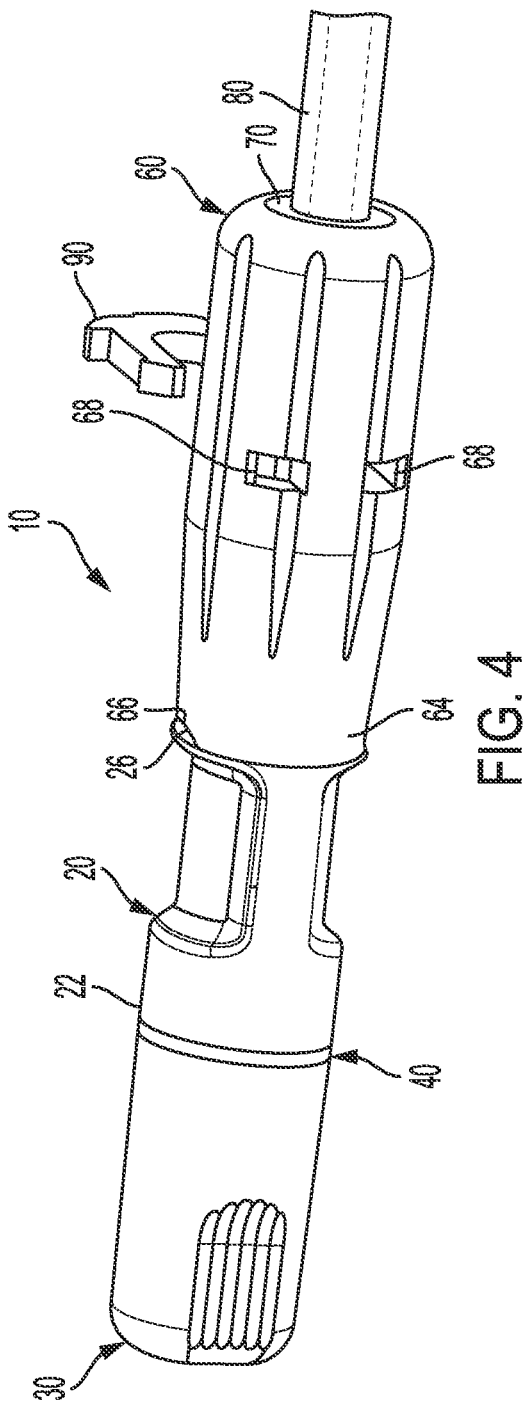

TUBE TWIST TUBING OCCLUDER

PRIORITY CLAIM AND CROSS-REFERENCE TO RELATED APPLICATIONS

The present application claims priority to and the benefit of U.S. Provisional Patent Application No. 63/292,799 filed Dec. 22, 2021, titled "TUBE TWIST TUBING OCCLUDER," the entire contents of which are incorporated by reference herein in their entirety and relied upon.

BACKGROUND

The present disclosure relates generally to medical fluid treatments and in particular to peritoneal dialysis ("PD") treatments.

DETAILED DESCRIPTION

Due to various causes, a person's renal system can fail. Renal failure produces several physiological derangements. It is no longer possible to balance water and minerals or to excrete daily metabolic load. Toxic end products of metabolism, such as urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Another type of kidney failure therapy is peritoneal dialysis ("PD"), which infuses a dialysis solution, also called dialysis fluid or PD fluid, into a patient's peritoneal chamber via a catheter. The PD fluid comes into contact with the peritoneal membrane in the patient's peritoneal chamber. Waste, toxins and excess water pass from the patient's bloodstream, through the capillaries in the peritoneal membrane, and into the PD fluid due to diffusion and osmosis, i.e., an osmotic gradient occurs across the membrane. An osmotic agent in the PD fluid provides the osmotic gradient. Used PD fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used PD fluid to drain from the patient's peritoneal cavity. The patient then switches fluid communication so that the patient catheter communicates with a bag of fresh PD fluid to infuse the fresh PD fluid through the catheter and into the patient. The patient disconnects the catheter from the fresh PD fluid bag and allows the PD fluid to dwell within the patient's peritoneal cavity, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

APD is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh PD fluid and to a fluid drain. APD machines pump fresh PD fluid from a dialysis fluid source, through the catheter and into the patient's peritoneal chamber. APD machines also allow for the PD fluid to dwell within the chamber and for the transfer of waste, toxins and excess water to take place. The source may include multiple liters of dialysis fluid, including several solution bags.

APD machines pump used PD fluid from the patient's peritoneal cavity, through the catheter, to drain. As with the manual process, several drain, fill and dwell cycles occur during dialysis. A "last fill" may occur at the end of the APD treatment. The last fill fluid may remain in the peritoneal chamber of the patient until the start of the next treatment, or may be manually emptied at some point during the day.

The patient for both CAPD and APD is provided with a transfer set, which is connected to the patient's indwelling catheter located within the patient's peritoneal cavity. The transfer set connects to the patient line during treatment, which allows fresh PD fluid to be delivered to and used PD fluid to be removed from the patient. One known transfer set 110 is illustrated in prior art FIG. 1. Known transfer set 110 includes a body 112 that threads at one end to a port adapter 114 and at an opposing end to a sleeve 116. Port adapter 114 is fitted with a cap 118. Cap 118 is removed from port adapter 114 to allow the patient line (not illustrated) to be connected to the patient's transfer set. A transfer set line 120 extends from a hose-barbed end of port adapter 114 to the patient's indwelling catheter (not illustrated).

Body 112 is provided with legs 112l that each extend to an occluder foot 112f. The patient is able to threadingly turn sleeve 116 relative to body 112. The patient threadingly turns sleeve 116 relative to body 112 in a first direction (counterclockwise) to unocclude or open transfer set line 120, so that fresh or used PD fluid may flow to or from the patient, respectively. The patient threadingly turns sleeve 116 relative to body 112 in a second direction (clockwise) to occlude or close transfer set line 120, so that fresh and used PD fluid flow is blocked.

The turning of sleeve 116 relative to body 112 in the first direction causes sleeve 116 to translate threadingly further off of body 112, so that internal clamping features on the inner wall of sleeve 116 allow legs 112l and occluder feet 112f to come free from transfer set line 120, opening the line (the situation illustrated in FIG. 1). The turning of sleeve 116 relative to body 112 in the second direction causes sleeve 116 to translate threadingly further onto body 112, so that internal clamping features on the inner wall of sleeve 116 force legs 112l and occluder feet 112f to come together, crimping transfer set line 120 closed.

As illustrated in FIG. 1, feet 112f fit within an undercut feature 116u provided on the inside of sleeve 116. Undercut feature 116u has to be machined, which adds an extra manufacturing step and expense to transfer set 110. A need exists accordingly for an improved PD transfer set.

SUMMARY

The present disclosure sets forth an improved peritoneal dialysis ("PD") transfer set. The transfer set of the present disclosure includes a body that threads at one end to a port adapter. The port adapter may be made of one piece or of two pieces that thread together. The body at its other end connects rotatably to a sleeve. The port adapter is fitted with a cap, which is removed from the port adapter to allow the patient line to be connected to the transfer set of the present disclosure. A transfer set line extends from a hose-barbed end of the port adapter (one or two piece) to the patient's indwelling catheter.

The transfer set of the present disclosure provides a twisting lug, which is in one embodiment overmolded onto the transfer set line, which may be silicone tubing. The twisting lug may alternatively be a separate piece that is secured to, for example, ultrasonically sealed, heat sealed or adhered (e.g., solvent bonded) to the transfer set line, such that the twisting lug is able to resist any shear force during or after twisting. The twisting lug includes an outwardly projecting and axially extending shape, such as a hexagon (polygon) shape, spline shape, or other desired key shape that allows the twisting lug and thus the transfer set line to be grabbed and twisted closed or untwisted open.

The sleeve is in one embodiment formed (e.g., injection molded) so as to have an internal profile that matches or forms a mating engagement with the hexagon (polygon) shape, spline shape, or other desired key shape of the twisting lug. The inner profile is provided on the inner surface or diameter of the sleeve. When the patient twists the sleeve, the matched or mated internal profile of the sleeve drives the hexagon (polygon) shape, spline shape, or other desired key shape of the twisting lug. The twisting lug, molded with or attached to the transfer set line, twists closed or untwists open the line, which is attached at one end to a hose-barbed end of the port adapter. The transfer set line may be only mechanically attached (e.g., press-fitted) to the hose-barbed end of the port adapter, or be adhered, e.g., solvent bonded, additionally or alternatively to the hose-barbed end of the port adapter.

Matching detents/detent receptacles between the open end of the sleeve and the connecting end of the body may be provided to hold the sleeve, twisting lug and transfer set line in a twisted closed or untwisted open position. The matching detents/detent receptacles also provide tactile feedback to the patient after fully threading the sleeve, indicating that the transfer set line has been twisted closed. The twisting of the transfer set line causes it to deform axially slightly. A threaded fit between the open end of the sleeve and the connecting end of the body also allows the sleeve to move closer to a non-threaded portion of the body (during twisting and tube closing) and to move away from the non-threaded portion of the body (during untwisting and tube opening). Such movement provides visual feedback to the patient regarding the occlusion and opening of the transfer set line. The threading also sets a single turning direction for occlusion (e.g., clockwise for right-handed threads) and a single turning direction for opening (e.g., counterclockwise for right-handed threads).

In an embodiment, the sleeve is provided with openings to allow a clip, such as an e-clip, to be snap-fitted into the sleeve. The clip is positioned at an axial location (i) that allows the patient to fully untwist and open the transfer set line, but (ii) that sets an end-of-travel for the sleeve in the opening direction so that the sleeve cannot be fully threaded off of the body. The clip abuts against the twisting lug at the end of travel, preventing the removal of the sleeve from the body. The abutting of the clip to the twisting lug may also be used to provide tactile feedback to the user indicating that the transfer set line has been opened fully and/or that no further unthreading is possible.

In light of the disclosure set forth herein, and without limiting the disclosure in any way, in a first aspect of the present disclosure, which may be combined with any other aspect, or portion thereof, a tube occluder includes a body within which an end of a tube is attached; a twisting lug formed with or attached to the tube, the twisting lug including an outwardly extending shape; and a sleeve in rotational communication with the body, the sleeve including an internal profile that matingly engages the outwardly extending shape of the twisting lug, the sleeve rotatable relative to the body in a first direction such that the internal profile causes the twisting lug to twist the tube closed, the sleeve rotatable relative to the body in a second direction such that the internal profile causes the twisting lug to twist the tube open.

In a second aspect of the present disclosure, which may be combined with any other aspect, or portion thereof, the tube is a transfer set line and the occluder is part of a peritoneal dialysis transfer set.

In a third aspect of the present disclosure, which may be combined with any other aspect, or portion thereof, the tube is attached to a barbed port located within the body.

In a fourth aspect of the present disclosure, which may be combined with any other aspect, or portion thereof, the barbed port extends from a threaded section that is threadingly connected to the body.

In a fifth aspect of the present disclosure, which may be combined with any other aspect, or portion thereof, the barbed port is part of a port adapter that houses a septum for sealing to a connector of a mating line.

In a sixth aspect of the present disclosure, which may be combined with any other aspect, or portion thereof, the twisting lug is overmolded onto the tube.

In a seventh aspect of the present disclosure, which may be combined with any other aspect, or portion thereof, the sleeve is in threading rotational communication with the body, and wherein rotating the sleeve in the first direction includes threading the sleeve further onto the body.

In an eighth aspect of the present disclosure, which may be combined with any other aspect, or portion thereof, the sleeve is in threading rotational communication with the body, and wherein rotating the sleeve in the second direction includes threading the sleeve further off of the body.

In a ninth aspect of the present disclosure, which may be combined with any other aspect, or portion thereof, the tube occluder includes a mechanism positioned to abut the twisting lug while rotating the sleeve in the second direction to prevent the sleeve from coming free from the body.

In a tenth aspect of the present disclosure, which may be combined with any other aspect, or portion thereof, the mechanism includes a clip inserted into the sleeve.

In an eleventh aspect of the present disclosure, which may be combined with any other aspect, or portion thereof, the sleeve is in detent communication with the body.

In a twelfth aspect of the present disclosure, which may be combined with any other aspect, or portion thereof, the detent communication is configured to at least one of (i) hold the sleeve in a user set position relative to the body, or (ii) provide tactile feedback to the user rotating the sleeve relative to the body in at least one of the first or second directions.

In a thirteenth aspect of the present disclosure, which may be combined with any other aspect, or portion thereof, the end of the tube is at least one of mechanically or adhesively attached within the body.

In a fourteenth aspect of the present disclosure, which may be combined with any other aspect, or portion thereof, the outwardly extending shape of the twisting lug is a polygon shape, spline shape, or key shape.

In a fifteenth aspect of the present disclosure, which may be combined with any other aspect, or portion thereof, the internal profile includes a mating polygon shape, spline shape, or key shape.

In a sixteenth aspect of the present disclosure, which may be combined with any other aspect, or portion thereof, a tube occluding method includes engaging a twisting lug with a sleeve, the twisting lug formed with or attached to a tube and including an outwardly extending shape, the sleeve including an internal profile that matingly engages the outwardly extending shape of the twisting lug; securing an end of the tube within a body; and enabling a user to rotate the sleeve relative to the body, the rotation causing the internal profile to turn the twisting lug and to twist the tube closed while the end of the tube remains secured within the body.

In a seventeenth aspect of the present disclosure, which may be combined with any other aspect, or portion thereof, the tube occluding method includes further enabling the user to rotate the sleeve in an opposite direction relative to the body, the opposite direction rotation causing the internal profile to turn the twisting lug in the opposite direction and to untwist the tube open while the end of the tube remains secured within the body.

In an eighteenth aspect of the present disclosure, which may be combined with any other aspect, or portion thereof, the tube occluding method includes preventing the sleeve from being rotated completely off of the body in the opposite direction.

In a nineteenth aspect of the present disclosure, which may be combined with any other aspect, or portion thereof, the tube occluding method includes providing at least one of tactile or visual feedback to the user indicating that the tube has been twisted closed.

In a twentieth aspect of the present disclosure, which may be combined with any other aspect, or portion thereof, any of the features, functionality and alternatives described in connection with any one or more of FIGS. 2 to 7 may be combined with any of the features, functionality and alternatives described in connection with any other of FIGS. 2 to 7.

In light of the above aspects and the present disclosure set forth herein, it is an advantage of the present disclosure to provide an improved peritoneal dialysis ("PD") transfer set.

It is another advantage of the present disclosure to provide an improved structure and methodology for occluding and opening tubing.

It is a further advantage of the present disclosure to provide a PD transfer set that is easily temporarily closed during treatment.

It is yet another advantage of the present disclosure to provide a PD transfer set that having parts that are easier and less expensive to produce.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE DRAWINGS

FIG. 3 is a perspective view of one embodiment of the PD transfer set of the present disclosure showing a sleeve, which is turned by the patient, removed to view an end-of-travel clip.

FIG. 4 is a perspective view of one embodiment of the PD transfer set of the present disclosure showing a longitudinal end-of-travel clip in a position to be inserted into the sleeve.

DETAILED DESCRIPTION

Figure 1:
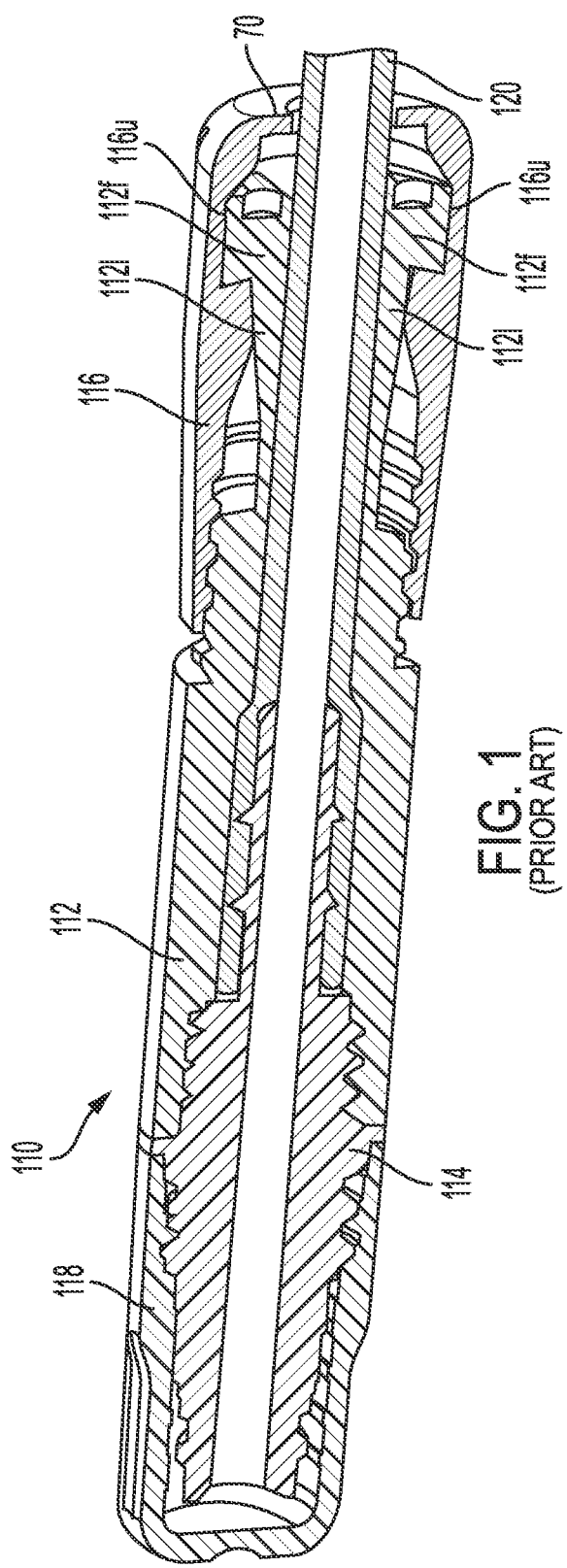
FIG. 1 is a perspective, sectioned view of a prior art peritoneal dialysis ("PD") transfer set.
Figure 2:
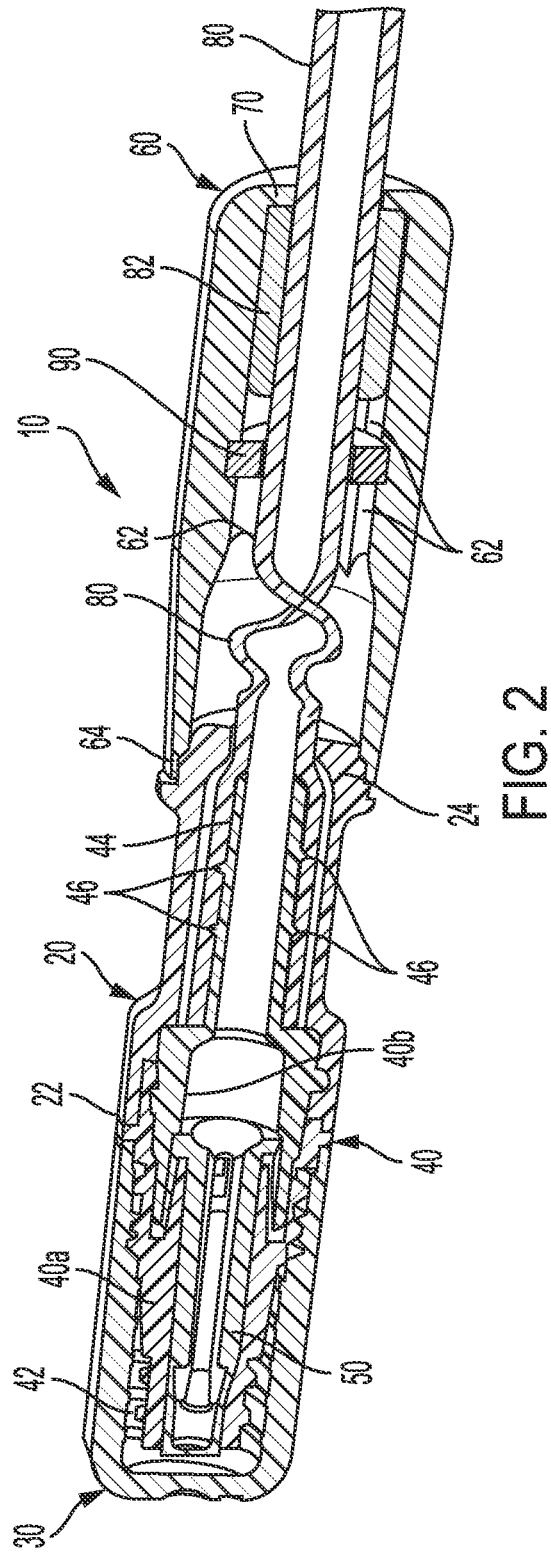
FIG. 2 is a perspective, sectioned view of one embodiment of a PD transfer set of the present disclosure, which is in a twisted closed condition.

Referring again to the drawings and in particular to FIGS. 2 and 3, an improved peritoneal dialysis ("PD") transfer set 10 is illustrated. Transfer set 10 of the present disclosure includes a body 20 that threads at one threaded end 22 to a port adapter 40. Body 20 at its other end 24 connects rotatably and in one embodiment threadingly to a sleeve 60.

Port adapter 40 may be made of one piece or of two pieces 40a, 40b that thread together as illustrated in FIG. 2. In the illustrated embodiment, port adapter piece 40a carries a valve 50, which may include a flexible, e.g., rubber, inner portion that sealingly accepts a luer fitting of a patient line connector (not illustrated), which connects to a luer threaded end 42 of port adapter piece 40a. One suitable valve for valve 50 is marketed under the tradename Clearlink™, which is described in U.S. Pat. No. 6,039,302, the entire contents of which are incorporated herein by reference and relied upon. Port adapter piece 40b includes a hose-barbed port 44 having a plurality of hose barbs 46.

Port adapter piece 40a is fitted initially and in one embodiment threadingly with a cap 30, which is removed from the port adapter to allow a patient line (not illustrated) to be connected to transfer set 10 of the present disclosure in the manner mentioned above. A transfer set line 80 extends from hose-barbed port 44 of the port adapter piece 40b to the patient's indwelling catheter (not illustrated).

Transfer set 10 of the present disclosure provides a twisting lug 82, which is in one embodiment overmolded onto transfer set line 80, which may be silicone tubing (or other medical grade polymer that does not appreciably resist being twisted), and wherein overmolded twisting lug 82 may or may not be silicone. Twisting lug 82 may alternatively be a separate piece that is secured to, for example, ultrasonically sealed, heat sealed or adhered (e.g., solvent bonded) to transfer set line 80. In any case, twisting lug 82 is able to resist shear forces during or after twisting. Any of body 20, port adapter 40, sleeve 60, the hard part of valve 50, and/or twisting lug 82 may be formed, e.g., molded, from a thermoplastic, such as polyetherimide ("PEI"), polyethersulfone ("PES"), polyamide/nylon ("PA"), acrylonitrile butadiene styrene ("ABS"), polycarbonate ("PC"), polyvinylchloride ("PVC") or polyetheretherketone ("PEEK"). The flexible portion of valve 50 may be formed, e.g., molded from an elastomer, such as ethylene propylene diene monomer ("EPDM") rubber, neoprene rubber, silicon rubber, thermo-plastic vulcunizates ("TPVs") and thermos-plastic elastomers ("TPEs").

Twisting lug 82 includes an outwardly projecting and axially extending shape, such as a hexagon shape as illustrated in FIG. 3, spline shape, or other desired key shape that allows twisting lug 82 and thus transfer set line 80 to be contacted and twisted closed or untwisted open. FIG. 2 illustrates a scenario in which transfer set line 80 has been twisted closed. Here, sleeve 60 is fully threaded onto threaded end 24 of body 20.

Sleeve 60 is in one embodiment formed (e.g., injection molded) so as to have an axially extending internal profile 62 that matches or forms a mating engagement with the hexagon (polygon) shape, spline shape, or other desired key shape of twisting lug 82. Inner profile 62 as illustrated in FIG. 2 is provided on an inner surface or diameter of sleeve 60. When the patient twists sleeve 60, the matched or mated internal profile 62 drives the hexagon (polygon) shape, spline shape, or other desired key shape of twisting lug 82 in the same rotational direction. Twisting lug 82, molded with or attached to transfer set line 80 in turn twists closed or untwists open the transfer set line, which is attached to hose-barbed port 44 of port adapter piece 40b. Transfer set line 80 may be only mechanically attached (e.g., press-fitted) to hose-barbed port 44 of port adapter piece 40b, or be adhered, e.g., solvent bonded, additionally or alternatively to the hose-barbed port 44. If adhered, hose barbs 46 may not be needed at port 44 of port adapter piece 40b.

Figure 5:
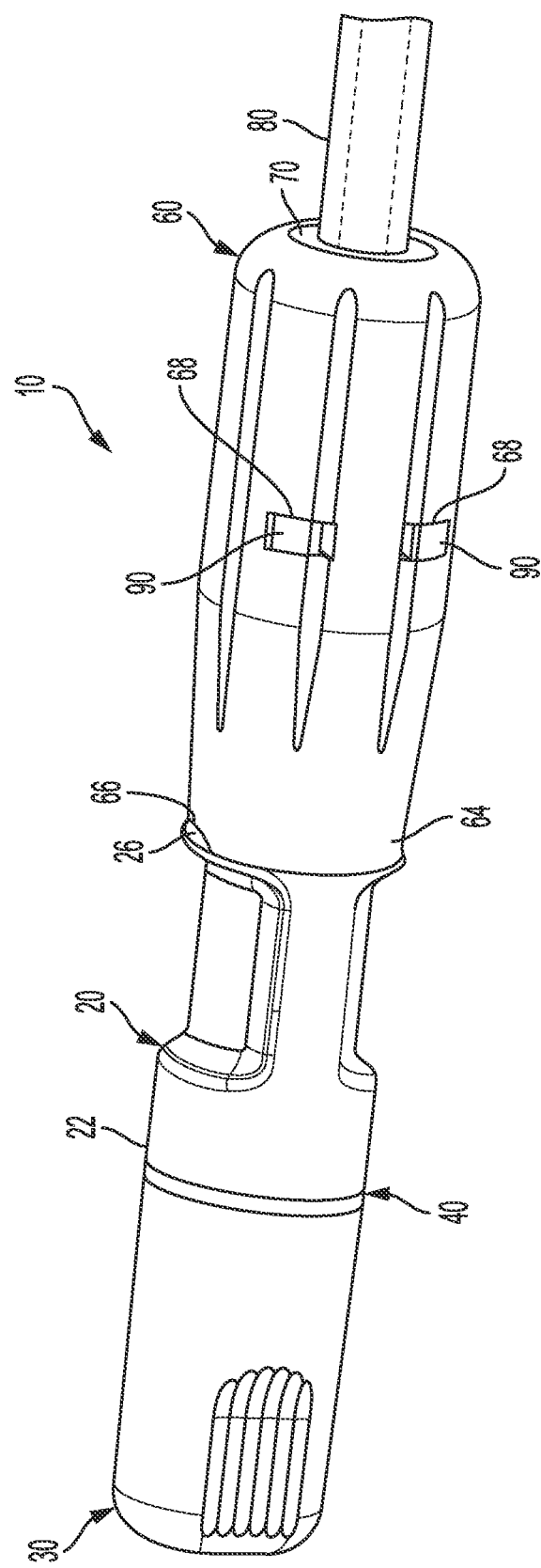
FIG. 5 is a perspective view of one embodiment of the PD transfer set of the present disclosure showing the longitudinal end-of-travel clip inserted into the sleeve.

FIGS. 3 to 5 illustrate that body 20 includes or defines at least one detent 26 that matches or mates with at least one detent receptacle 66 provided by or formed with sleeve 66. In the illustrated embodiment, at least one detent 26 and corresponding at least one detent receptacle 66 are provided so as to come together when sleeve 60 has been threaded fully onto threaded end 24 of body 20, which coincides with transfer set line 80 being fully twisted and occluded. In an alternative embodiment, at least one detent may be provided instead at open end 64 of sleeve 60, while the mating at least one detent receptacle is provided at threaded end 24 of body 20. In either case, the engagement of at least one detent 26 to at least one detent receptacle 66 is configured so as not to cause undue resistance to the patient in threading sleeve 60 onto and off of body 20. The engagement of at least one detent 26 to at least one detent receptacle 66 is also configured, however, along with the holding force due to sleeve 60 being threaded onto body 20, to be robust enough to hold the sleeve, twisting lug and transfer set line 80 in a twisted closed position. Especially with low durometer tubing 80, such as silicone tubing having a 30 to 60 shore A durometer, such as 50 shore A durometer, the holding force due to sleeve 60 being threaded onto body 20 may be robust enough by itself to hold the sleeve, twisting lug and transfer set line 80 in a twisted closed position.

Matching at least one detent 26 and detent receptacle 66 provide tactile feedback to the patient at the end of turning sleeve 60 relative to body 20, indicating that transfer set line 80 has been twisted fully closed. The twisting of transfer set line 80 causes the line to deform axially slightly. The threaded fit between sleeve 60 and body 20 allows sleeve 60 to move closer to a non-threaded portion of body 20 (during tube twisting and closing) and to move away from the non-threaded portion of body 20 (during tube untwisting and opening), which allows for the axial shortening and lengthening of line 80 during twisting and untwisting, respectively. The movement of sleeve 60 towards and away from the non-threaded portion of body 20 also provides visual feedback to the patient regarding the occlusion and opening of transfer set line 80. The threading further sets a single turning direction for occlusion (e.g., clockwise for right-handed threads) and a single turning direction for opening (e.g., counterclockwise for right-handed threads).

As illustrated in FIGS. 4 and 5, in an embodiment, sleeve 60 is provided with openings 68 to allow a clip 90 (FIGS. 2 to 5), such as spring clip or e-clip, to be snap-fitted into sleeve 60. Clip 90 is in one embodiment positioned at an axial location (i) that allows the patient to fully untwist and open the transfer set line 80, but (ii) that sets an end-of-travel for sleeve 60 in the opening direction, so that sleeve 60 cannot be fully threaded off of body 20. Clip 90 abuts against twisting lug 82 at the end of travel, preventing the removal of sleeve 60 from body 20. The abutting of clip 90 relative to twisting lug 82 may also be used to provide tactile feedback to the user that transfer set line 80 has been opened fully and/or that no further unthreading is possible. In a related embodiment, sleeve 60 may be constructed with an interior stop or other similar mechanical feature, so as to eliminate the need for clip 90.

Figure 6:
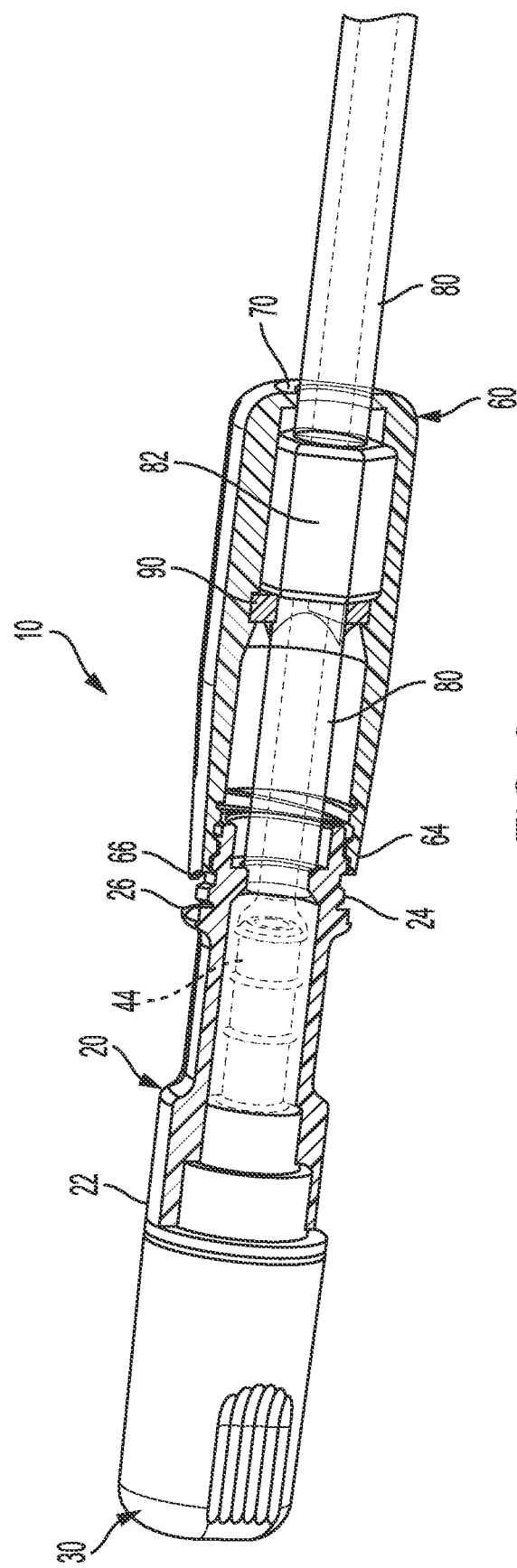
FIG. 6 is a perspective, partially sectioned view of one embodiment of a PD transfer set of the present disclosure, which is in an untwisted open condition.

FIG. 6 illustrates transfer set 10 in a condition in which the patient has opened transfer set line 80 such that it is no longer twisted or occluded. Notably, open, threaded end 64 of sleeve 60 is shown as being partially threaded off of threaded end 24 of body 20, such that detent receptacle 66 is backed away from detent 26. Similarly, flange 70 at the end of sleeve 60 is shown as having been backed away from twisting lug 82. Further similarly, clip 90 is shown as having been translated towards twisting lug 82, such that clip 90 abuts the twisting lug prior to sleeve 60 full unthreading fully off of, or coming free from, threaded end 24 of body 20.

Figure 7:
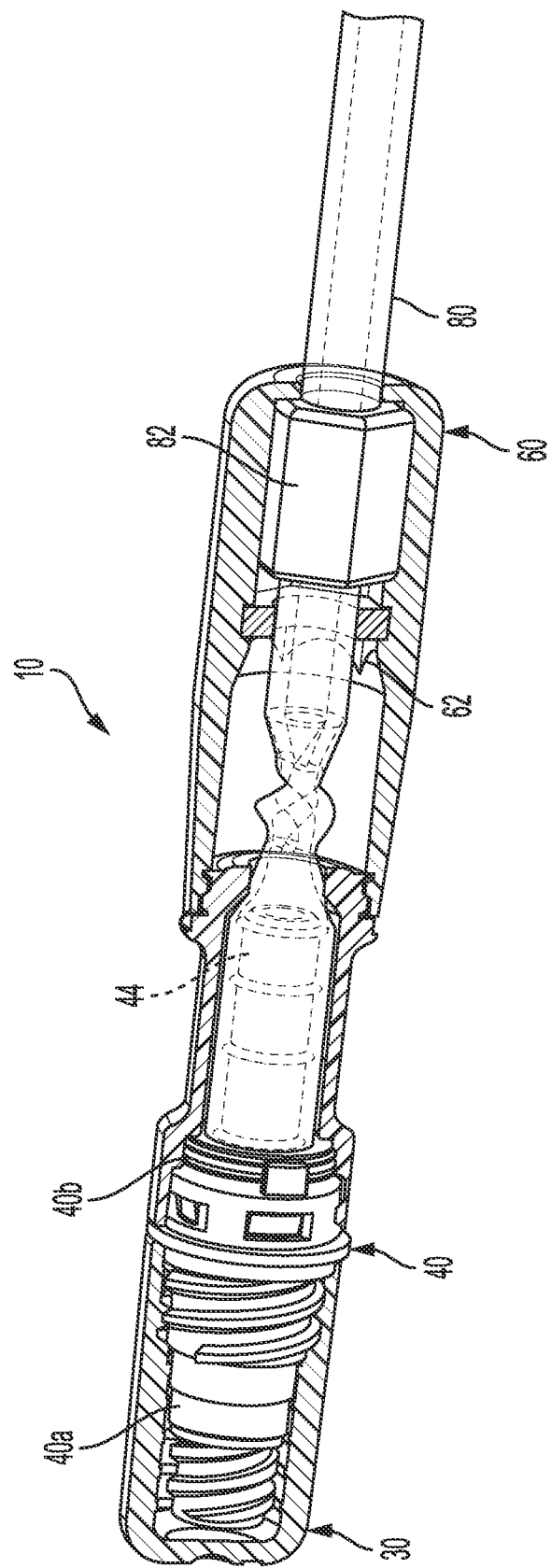
FIG. 7 is a perspective, partially sectioned view of one embodiment of a PD transfer set of the present disclosure, which is in a twisted closed condition.

FIG. 7, similar to FIG. 2, illustrates transfer set 10 in a condition in which the patient has twisted transfer set line 80 closed. FIG. 7 shows the twisted portion of transfer set line 80 in full view, while FIG. 2 illustrates the same portion sectioned. Both FIGS. 2 and 7 show that the twisting of the present disclosure fully occludes the tube. The low durometer material used for transfer set line 80 allows for it to be closed and opened over and over again repeatedly and without significant permanent deformation. FIG. 7 further illustrates that valve 50 illustrated in FIG. 2 is not required and that instead a standard luer fitting may be used at port adapter piece 40a of port adapter 40.

Testing of the presently described tube twisting of transfer set 10 has shown that transfer set line 80 folds initially approximately 45 degrees starting near the end of hose-barbed port 44 and then folds again further away from hose-barbed port 44. Subsequent twisting adds a series of folds, which are somewhat helical. A total free length needed to fully occlude transfer set line 80 has been found to be less than 2.54 cm (one inch).

It should be understood that various changes and modifications to the presently preferred embodiments described herein will be apparent to those skilled in the art. It is therefore intended that any or all of such changes and modifications may be covered by the appended claims. For example, while twisted tube occlusion is illustrated in connection with a PD transfer set, the twisted tube occlusion of the present disclosure may be used to occlude any type of tube, e.g., for any type of medical fluid delivery.

The invention claimed is:

1. A tube occluder comprising:
   a body within which an end of a tube is attached;
   a twisting lug formed with or attached to the tube, the twisting lug including an outwardly extending shape; and
   a sleeve in rotational communication with the body, the sleeve including an internal profile that matingly engages the outwardly extending shape of the twisting lug, the sleeve rotatable relative to the body in a first direction such that the internal profile causes the twisting lug to twist the tube closed, the sleeve rotatable relative to the body in a second direction such that the internal profile causes the twisting lug to twist the tube open,
   wherein the tube is attached to a barbed port located within the body and is part of a port adapter that houses a septum for sealing to a connector of a mating line.

2. The tube occluder of claim 1, wherein the tube is a transfer set line and the occluder is part of a peritoneal dialysis transfer set.

3. The tube occluder of claim 1, wherein the barbed port extends from a threaded section that is threadingly connected to the body.

4. The tube occluder of claim 1, wherein the twisting lug is overmolded onto the tube.

5. The tube occluder of claim 1, wherein the sleeve is in threading rotational communication with the body, and wherein rotating the sleeve in the first direction includes threading the sleeve further onto the body.

6. The tube occluder of claim 1, wherein the sleeve is in threading rotational communication with the body, and wherein rotating the sleeve in the second direction includes threading the sleeve further off of the body.

7. The tube occluder of claim 6, which includes a mechanism positioned to abut the twisting lug while rotating the sleeve in the second direction to prevent the sleeve from coming free from the body.

8. The tube occluder of claim 1, wherein the sleeve is in detent communication with the body.

9. The tube occluder of claim 1, wherein the sleeve is in detent communication with the body.

10. The tube occluder of claim 9, wherein the detent communication is configured to at least one of (i) hold the sleeve in a user set position relative to the body, or (ii) provide tactile feedback to the user rotating the sleeve relative to the body in at least one of the first or second directions.

11. The tube occluder of claim 1, wherein the end of the tube is at least one of mechanically or adhesively attached within the body.

12. The tube occluder of claim 1, wherein the outwardly extending shape of the twisting lug is a polygon shape, spline shape, or key shape.

13. The tube occluder of claim 12, wherein the internal profile includes a mating polygon shape, spline shape, or key shape.

14. A tube occluding method comprising:
   engaging a twisting lug with a sleeve, the twisting lug formed with or attached to a tube and including an outwardly extending shape, the sleeve including an internal profile that matingly engages the outwardly extending shape of the twisting lug;
   securing an end of the tube to a barbed port within a body; and
   enabling a user to rotate the sleeve relative to the body, the rotation causing the internal profile to turn the twisting lug and to twist the tube closed while the end of the tube remains secured within the body,
   wherein the barbed port is part of a port adapter that houses a septum for sealing to a connector of a mating line.

15. The tube occluding method of claim 14, which includes further enabling the user to rotate the sleeve in an opposite direction relative to the body, the opposite direction rotation causing the internal profile to turn the twisting lug in the opposite direction and to untwist the tube open while the end of the tube remains secured within the body.

16. The tube occluding method of claim 15, which includes preventing the sleeve from being rotated completely off of the body in the opposite direction.

17. The tube occluding method of claim 15, which includes providing at least one of tactile or visual feedback to the user indicating that the tube has been twisted closed.

* * * * *